US012641423B2

(12) United States Patent
Kotvis et al.

(10) Patent No.: US 12,641,423 B2
(45) Date of Patent: May 26, 2026

(54) IDENTITY REGISTRATION FOR WIRELESS NETWORKS

(71) Applicant: Insight Direct USA, Inc., Chandler, AZ (US)

(72) Inventors: Benjamin Kotvis, Sussex, WI (US); Cory Douglas Peterson, Safety Harbor, FL (US); Michael James Sciacero, Phoenix, AZ (US)

(73) Assignee: Insight Direct USA, Inc., Chandler, AZ (US)

( * ) Notice: Subject to any disclaimer, the term of this patent is extended or adjusted under 35 U.S.C. 154(b) by 0 days.

(21) Appl. No.: 18/680,088

(22) Filed: May 31, 2024

(65) Prior Publication Data

US 2025/0374048 A1    Dec. 4, 2025

(51) Int. Cl.
*H04W 12/069* (2021.01)
*H04W 8/20* (2009.01)

(52) U.S. Cl.
CPC ........... *H04W 12/069* (2021.01); *H04W 8/20* (2013.01)

(58) Field of Classification Search
CPC .............................. H04W 12/069; H04W 8/20
See application file for complete search history.

(56) References Cited

U.S. PATENT DOCUMENTS

| | | | |
|---|---|---|---|
| 9,503,452 B1 * | 11/2016 | Kumar | H04L 63/0838 |
| 9,596,605 B2 | 3/2017 | Ranade et al. | |
| 10,136,322 B2 | 11/2018 | Rougier | |
| 10,182,350 B2 | 1/2019 | Sheu et al. | |
| 10,341,320 B2 | 7/2019 | Hanay et al. | |
| 10,630,486 B2 | 4/2020 | Lindell et al. | |
| 10,771,967 B2 | 9/2020 | Hanay et al. | |
| 10,945,127 B2 | 3/2021 | Li et al. | |
| 11,005,836 B2 | 5/2021 | Hanay et al. | |
| 11,399,283 B2 | 7/2022 | Anantha et al. | |
| 11,451,959 B2 | 9/2022 | Windsor et al. | |
| 11,582,604 B2 * | 2/2023 | Olshansky | H04W 12/0433 |
| 11,627,464 B2 | 4/2023 | Ficara et al. | |
| 11,665,544 B2 | 5/2023 | Campiglio et al. | |
| 2007/0280481 A1 | 12/2007 | Eastlake et al. | |
| 2009/0028335 A1 | 1/2009 | Van | |
| 2013/0298182 A1 | 11/2013 | May | |
| 2014/0071967 A1 | 3/2014 | Velasco | |

(Continued)

FOREIGN PATENT DOCUMENTS

| | | |
|---|---|---|
| CA | 2446364 C | 5/2013 |
| EP | 1385311 B1 | 5/2008 |

(Continued)

*Primary Examiner* — Techane Gergiso
(74) *Attorney, Agent, or Firm* — Kinney & Lange, P.A.

(57) ABSTRACT

A network system includes a processor and computer-readable memory. The computer-readable memory is encoded with instructions that, when executed by the processor, cause the network system to register a unique pre-shared key, a user profile, and a network policy. The instructions further associate the unique pre-shared key with the user profile to form a key-user pair, associate the key-user pair with the network policy to form a mapped key-user pair, and provide the unique pre-shared key to a user to connect one or more devices to a wireless network. The unique pre-shared key is used to encrypt and decrypt data transmitted between a connected wireless device and the wireless network.

16 Claims, 6 Drawing Sheets

(56)  References Cited

U.S. PATENT DOCUMENTS

| | | | |
|---|---|---|---|
| 2014/0073288 A1 | 3/2014 | Velasco | |
| 2014/0073289 A1 | 3/2014 | Velasco | |
| 2014/0233545 A1 | 8/2014 | Ferguson-jarnes et al. | |
| 2016/0301675 A1 | 10/2016 | Wiles et al. | |
| 2017/0111799 A1 | 4/2017 | Zheng | |
| 2020/0187008 A1* | 6/2020 | Ding | H04W 12/06 |
| 2020/0274707 A1 | 8/2020 | Kiiskilä | |
| 2022/0150323 A1 | 5/2022 | Aluvala et al. | |
| 2022/0229928 A1 | 7/2022 | Shachar et al. | |
| 2022/0255747 A1 | 8/2022 | Sloane et al. | |
| 2022/0322091 A1 | 10/2022 | Neipris et al. | |
| 2023/0198976 A1 | 6/2023 | Jahner et al. | |
| 2024/0121609 A1* | 4/2024 | Neipris | H04W 12/043 |
| 2024/0179131 A1* | 5/2024 | Balaganoor | H04L 9/0838 |
| 2024/0205681 A1* | 6/2024 | Comarmond | H04W 8/205 |
| 2024/0323034 A1 | 9/2024 | Kumar | |
| 2024/0323816 A1* | 9/2024 | Gopi | H04L 61/4511 |
| 2024/0349052 A1* | 10/2024 | Madappa | H04W 12/069 |

FOREIGN PATENT DOCUMENTS

| | | |
|---|---|---|
| EP | 1887730 B1 | 7/2013 |
| EP | 2661681 A4 | 1/2017 |
| EP | 2223463 B1 | 5/2017 |
| EP | 3195640 A1 | 7/2017 |
| EP | 2345268 B1 | 8/2019 |
| EP | 3577849 A1 | 12/2019 |
| EP | 1915837 B1 | 4/2020 |
| EP | 3494721 B1 | 6/2020 |
| EP | 3275234 B8 | 3/2021 |
| EP | 3342118 B1 | 8/2021 |
| EP | 3563599 B1 | 10/2021 |
| EP | 3759957 A4 | 2/2022 |
| EP | 4028871 A1 | 7/2022 |
| EP | 4114061 A1 | 1/2023 |
| EP | 3669564 B1 | 3/2023 |
| GB | 2531247 B | 10/2021 |
| IN | 377753 B | 10/2011 |
| MX | 2022003781 A | 6/2022 |
| WO | 2006129287 A1 | 12/2006 |

* cited by examiner

Register a unique pre-shared key, a user profile, and a network policy — 110

Associate the unique pre-shared key with the user profile to form a key-user pair — 112

Associate the key-user pair with the network policy to form a mapped key-user — 114

Provide the unique pre-shared key to a user to connect one or more devices to a wireless network — 116

100

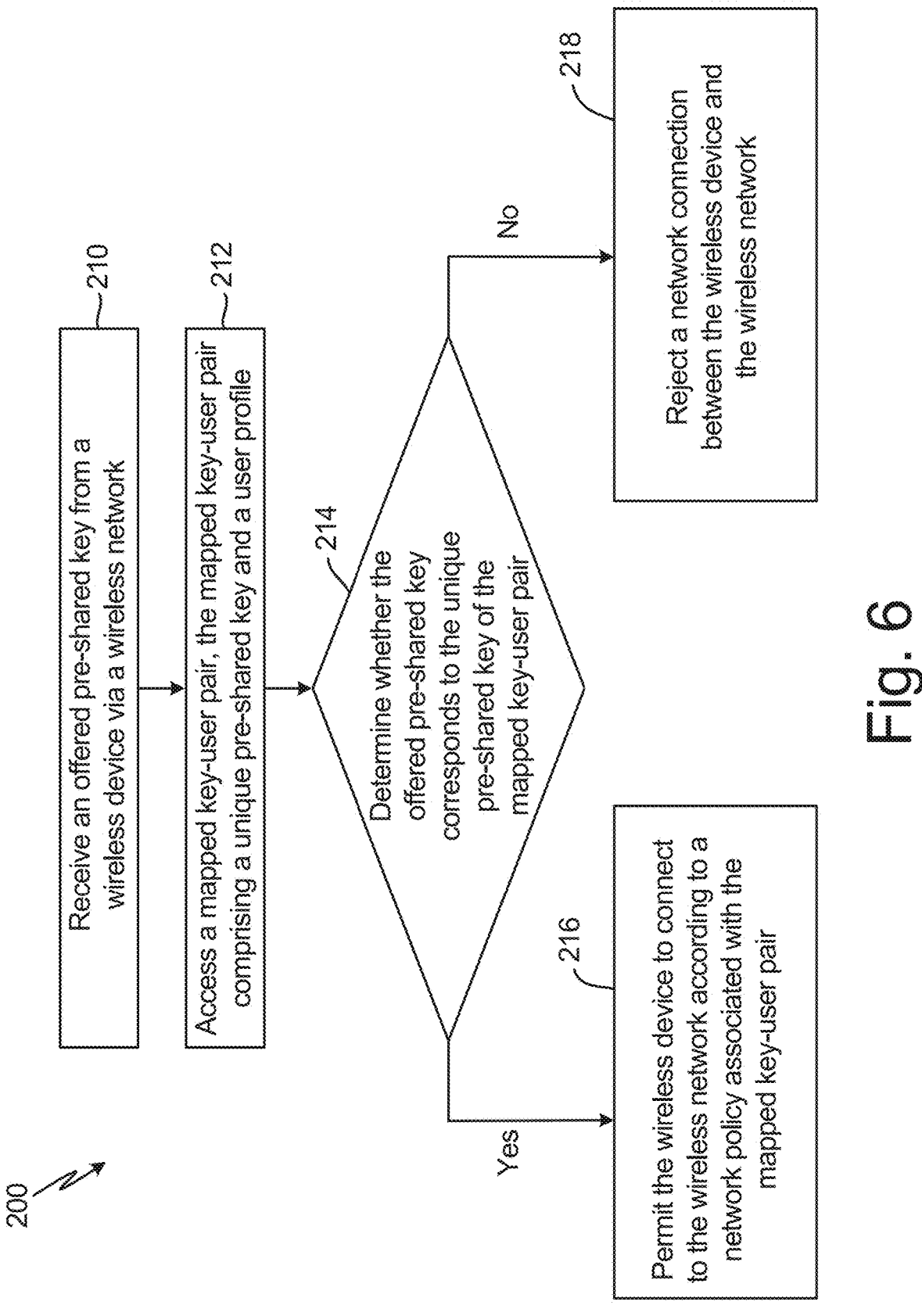

200

Receive an offered pre-shared key from a wireless device via a wireless network — 210

Access a mapped key-user pair, the mapped key-user pair comprising a unique pre-shared key and a user profile — 212

Determine whether the offered pre-shared key corresponds to the unique pre-shared key of the mapped key-user pair — 214

No

Reject a network connection between the wireless device and the wireless network — 218

Yes

Permit the wireless device to connect to the wireless network according to a network policy associated with the mapped key-user pair — 216

Fig. 6

IDENTITY REGISTRATION FOR WIRELESS NETWORKS

BACKGROUND

The present disclosure relates generally to managed wireless networks, and more specifically to a method and system for registering the identity of a user on a managed wireless network.

To manage devices connected to a wireless network, network infrastructure must be able to distinguish between device connections to apply the appropriate network policies. Most managed wireless networks individually handle each connected device when applying network policies. This network setup requires networks to store device-identifying information for each device, such as a MAC address for each device. Users of managed wireless networks that operate on the device level are often required to provide device-identifying information, such as the MAC address, and must configure their desired network policies for each individual device. When connecting to a managed wireless network, many nontechnical users may not be able to connect their devices on their own and require further technical assistance.

SUMMARY

In one example, a network system includes a processor and computer-readable memory. The computer-readable memory is encoded with instructions that, when executed by the processor, cause the network system to register a unique pre-shared key, a user profile, and a network policy. The instructions further associate the unique pre-shared key with the user profile to form a key-user pair, associate the key-user pair with the network policy to form a mapped key-user pair, and provide the unique pre-shared key to a user to connect one or more devices to a wireless network. The unique pre-shared key is used to encrypt and decrypt data transmitted between a connected wireless device and the wireless network.

In another example, a method of identity registration for a managed wireless network includes registering a unique pre-shared key, a user profile, and a network policy. The method further includes associating the unique pre-shared key with the user profile to form a key-user pair, associating the key-user pair with the network policy to form a mapped key-user pair, and providing the unique pre-shared key to a user to connect one or more devices to a wireless network. The method further includes encrypting and decrypting data transmitted between a connected wireless device and the wireless network using the unique pre-shared key.

BRIEF DESCRIPTION OF THE DRAWINGS

FIG. 6 is a process flowchart showing steps of a process for authentication with a pre-shared key.

DETAILED DESCRIPTION

The present disclosure is directed to systems and methods for registering and authenticating a user for connecting devices to a managed wireless network. The disclosed systems and methods allow a user to connect devices using a single pre-shared key (PSK) registered to the user without the need to register and configure each individual device or to provide device identification information, such as a MAC address. Each PSK is also mapped to a set of network policies that governs access to the network for each registered user. Advantageously, the systems and methods disclosed herein allow for users to connect their devices to a managed wireless network without needing to register each device individually or provide any device-identifying information. Further, all devices connected using the same PSK benefit from the same network policy configuration upon initial connection to the managed wireless network. The network system and corresponding methods according to techniques of this disclosure will be described below with reference to FIGS. 1-4.

Figure 1:
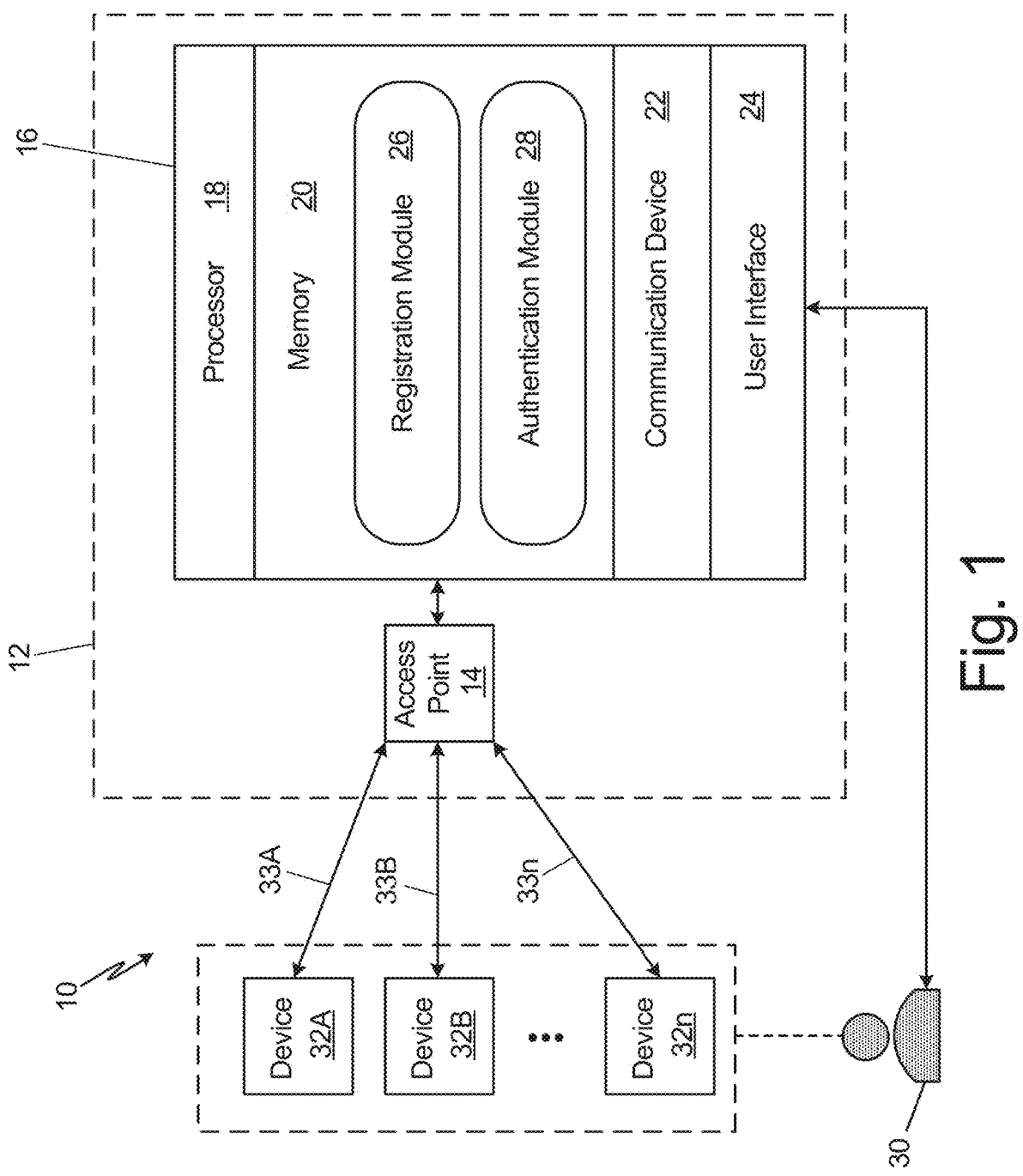
FIG. 1 is a schematic block diagram of a network system.

FIG. 1 is a schematic block diagram of network system 10. FIG. 1 shows network system 10 and wireless network 12. Network system 10 includes access point 14 and access server 16. Access server 16 includes processor 18, memory 20, communication device 22, and user interface 24. Access server 16 further includes registration module 26 and authentication module 28. Network system 10 further includes user 30, devices 32A-32$n$ (where "n" is used herein as an arbitrary positive integer that is greater than or equal to one to indicate any number of the referenced component), and wireless connections 33A-33$n$.

Network system 10 is a system for administering managed network services (e.g., managing the infrastructure, software, and technical support to operate a network) for an organization. More specifically, network system 10 is a system for registering and authenticating a user for connecting a device to a wireless network (e.g., wireless network 12). In some examples, network system 10 can be implemented for a multi-dwelling unit (MDU), such as a residence hall, a senior living facility, etc. In some examples, network system 10 can be at least partially implemented using existing network infrastructure associated with an organization. In some examples, network system 10 can be at least partially cloud-based (i.e., some computing services or resources of network system 10 are made available over the Internet).

Network system 10 utilizes wireless network 12. As shown in FIG. 1, some components of network system 10 reside on, or are part of, wireless network 12 (e.g., access point 14 and access server 16). Wireless network 12 is a computer network that uses wireless data connections. Wireless network 12 can be, for example, a local area network (LAN), a building area network, a campus area network, a metropolitan area network, or another suitable network type. Wireless network 12 can be referred to as a managed wireless network, at least to the extent that operations of wireless network 12 are managed via network system 10. In some examples, wireless network 12 can be configured as a guest network. In some examples, wireless network 12 can be configured as an internet of things (IoT) network. Wireless network 12 can include any suitable combination of hardware devices such as, for example, one or more routers, switches, hubs, modems, bridges, and/or gateways, among other options. Access point 14 and access server 16 of network system 10 are part of wireless network 12.

Access point 14 is an access point for wireless network 12. Access point 14 can be any network device that facilitates the wireless connection of devices 32A-32$n$ to components of wireless network 12 (such as, e.g., access server 16). Access point 14 can be, for example, a router, a switch, a hub, a modem, a bridge, a gateway, or any similar device or combination of devices. When connecting to wireless network 12, devices 32A-32n connect to access point 14. Wireless connections 33A-33n represent wireless connections between respective ones of devices 32A-32n and wireless network 12 via access point 14. Specifically, device 32A forms wireless connection 33A to access point 14, device 32B forms wireless connection 33B to access point 14, and device 32n forms wireless connection 33n to access point 14.

Access server 16 is an access server of network system 10 that is connected to wireless network 12. Access server 16 is also communicatively connected to access point 14 to transmit and/or receive data. For example, access server 16 can have a wired or wireless connection to access point 14. Generally, access server 16 provides centralized authentication, authorization, and accounting (AAA) management for network system 10. In some examples, access server 16 implements a Remote Authentication Dial-In User Service (RADIUS) protocol. Access server 16 includes processor 18, memory 20, communication device 22, and user interface 24. Although components of access server 16 are represented schematically in FIG. 1 as parts of a same device, it should be understood that, in other examples, components of access server 16 can be separate devices that are communicatively connected in network system 10.

Processor 18 can execute software, applications, and/or programs stored on memory 20. Examples of processor 18 can include a processor, a microprocessor, a controller, a digital signal processor (DSP), an application specific integrated circuit (ASIC), a field-programmable gate array (FPGA), or other equivalent discrete or integrated logic circuitry. Processor 18 can be entirely or partially mounted on one or more circuit boards.

Access server 16 includes memory 20. Memory 20 is configured to store information and, in some examples, can be described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 20 can be entirely or partly temporary memory, meaning that a primary purpose of memory 20 is not long-term storage. Memory 20, in some examples, is described as volatile memory, meaning that memory 20 does not maintain stored contents when power to devices (e.g., hardware of access server 16) is turned off. Examples of volatile memories can include random access memories (RAM), dynamic random access memories (DRAM), static random access memories (SRAM), and other forms of volatile memories. Memory 20, in some examples, also includes one or more computer-readable storage media. Memory 20 can be configured to store larger amounts of information than volatile memory. Memory 20 can further be configured for long-term storage of information. In some examples, memory 20 includes non-volatile storage elements. Examples of such non-volatile storage elements include, for example, magnetic hard discs, optical discs, flash memories, or forms of electrically programmable memories (EPROM) or electrically erasable and programmable memories (EEPROM).

In some examples, memory 20 is encoded with, or used to store, program instructions for execution by processor 18. In some examples, memory 20 is used by software or applications running on access server 16 to temporarily store information during program execution. Memory 20 can be configured to store information before, during, and/or after operation of access server 16 in network system 10. In FIG. 1, memory 20 is illustrated schematically as a component of access server 16. In some examples, memory 20 can include local storage that is part of a same device as other components of access server 16. In other examples, memory 20 can include remote storage, such as cloud-based storage that is coupled to access server 16, or a separate data store, such as a database.

The functionality of access server 16 can be further defined as a set of functional modules. Although the functionality of access server 16 is described herein as being divided into two modules, it should be understood that the functionality of access server 16 could also be described as more or fewer modules, which could depend, in some examples, on how the software is written or organized. As illustrated in FIG. 1, access server 16 includes registration module 26 and authentication module 28. Registration module 26 and authentication module 28 will generally be described sequentially herein; however, these modules need not always be performed in any particular order and may also include overlapping or interspersed functionality.

Registration module 26 is a first functional module of access server 16. In one example, registration module 26 is a software module encoded in memory 20 and executed by processor 18 of access server 16. Registration module 26 registers and accesses user identities for network system 10. Registration module 26 will be described in greater detail below with reference to FIGS. 2-3. Authentication module 28 is a second functional module of access server 16. In one example, authentication module 28 is a software module encoded in memory 20 and executed by processor 18 of access server 16. Authentication module 28 authenticates users (e.g., user 30) based on stored user identities for network system 10 to permit or reject device connection attempts. Authentication module 28 will be described in greater detail below with reference to FIG. 4.

Access server 16 further includes communication device 22. Communication device 22 receives inbound and outbound data transmissions from devices 32A-32n (e.g., via access point 14) and permits access server 16 to connect to wireless network 12. Communication device 22 may be, for example, a network interface card (NIC) (also sometimes referred to as a network card or network interface controller) or other similar electronic device for permitting access server 16 to connect to and exchange data using wireless network 12. For example, communication device 22 can be part of the computer hardware of access server 16, such as embedded in a motherboard, or can be an external device that is coupled to access server 16.

Access server 16 further includes user interface 24. User interface 24 is an input and/or output device of access server 16, which may be integrated with or connected to access server 16. For example, user interface 24 can include graphical and/or physical control elements that enable user input to interact with access server 16. In some examples, user interface 24 includes a display device, such as a liquid crystal display (LCD), a light-emitting diode (LED) display, an organic light-emitting diode (OLED) display, or other display device suitable for providing information to users in visual form. In some examples, user interface 24 can take the form of a graphical user interface (GUI) that presents graphical control elements at, e.g., a touch-sensitive and/or presence sensitive display screen. In such examples, user input can be received in the form of gesture input, such as touch gestures, scroll gestures, zoom gestures, or other gesture input. In certain examples, user interface 24 can take the form of and/or include physical control elements, such as a keyboard, a mouse, a joystick, or other physical control elements configured to receive user input to interact with access server 16.

User interface 24 permits user 30 or an administrator to interact with access server 16, such as to receive or input information or to control operations of access server 16. In some examples, user interface 24 allows user 30 or an administrator to input, access, and/or modify user profile information and/or receive a pre-shared key, as will be described in greater detail below with reference to FIG. 2. In some examples, user interface 24 allows user 30 or an administrator to access or modify other aspects of access server 16, such as to update stored pre-shared keys, network policies, etc. In such examples, user interface 24 can take the form of or include a web portal, a web or mobile application, or other similar interface.

Devices 32A-32n are electronic devices controlled by and/or associated with user 30. Devices 32A-32n include networking capability such that each of devices 32A-32n can connect to wireless network 12 via a corresponding wireless connection 33A-33n. Each of devices 32A-32n can be, for example, a computer, a smartphone, a home assistant, a smart device, an electronic sensor, a computer vision device, a virtual reality device, or an augmented reality device, among other options. Devices 32A-32n can also be referred to as IoT devices. In some examples, one or more of devices 32A-32n may be a "headless" device (i.e., a device without a display, such as a smart speaker for a smart home platform). FIG. 1 shows three devices 32A-32n; however, other examples can include any number of devices 32A-32n, such as a single device, two devices, or more than three devices.

User 30 owns, controls, and/or is associated with devices 32A-32n. In one example, user 30 can be an owner or user of devices 32A-32n. User 30 can initiate a connection request for any one or more of devices 32A-32n to wireless network 12 via access point 14. In another example, user 30 can be a system administrator who sets up and manages network access for devices 32A-32n on behalf of the owner or user of devices 32A-32n, such as in a residence hall setting or the like. User 30 can interact with access server 14 via user interface 24. Although user 30 will be a single person is many examples, user 30 can also represent a group of device users treated as a single unit, such as residents of dorm room or a group of guests in a hotel room, for example. Different users will have different identities within network system 10, but all users can connect to wireless network 12. On the other hand, multiple devices for the same user (e.g., devices 32A-32n for user 30) will be associated with the same identity within network system 10, so the multiple devices can be grouped on wireless network 12.

Network system 10, including registration module 26 and authentication module 28, is configured to seamlessly authenticate users. Further, the identities in network system 10 are user-based rather than device-based. This is useful for contexts where user 30 is nontechnical and can reduce the IT support burden for onboarding devices 32A-32n to wireless network 12. Likewise, seamless authentication in network system 10 is important where ones of devices 32A-32n are headless devices and it would be otherwise difficult or cumbersome to access device-identifying information for the headless device. Conventional managed wireless networks use device-identifying information—particularly the MAC address—for governing access to the network. Randomization of MAC addresses can cause problems in these conventional network setups because if network access is based on the MAC address and the MAC address changes, then the user must be reconnected using the new MAC address each time this occurs, which is time consuming and unrealistic in many scenarios. In network system 10, it is irrelevant if the MAC address changes or what it is in the first place because identities are not linked to device-identifying information.

Figure 2:
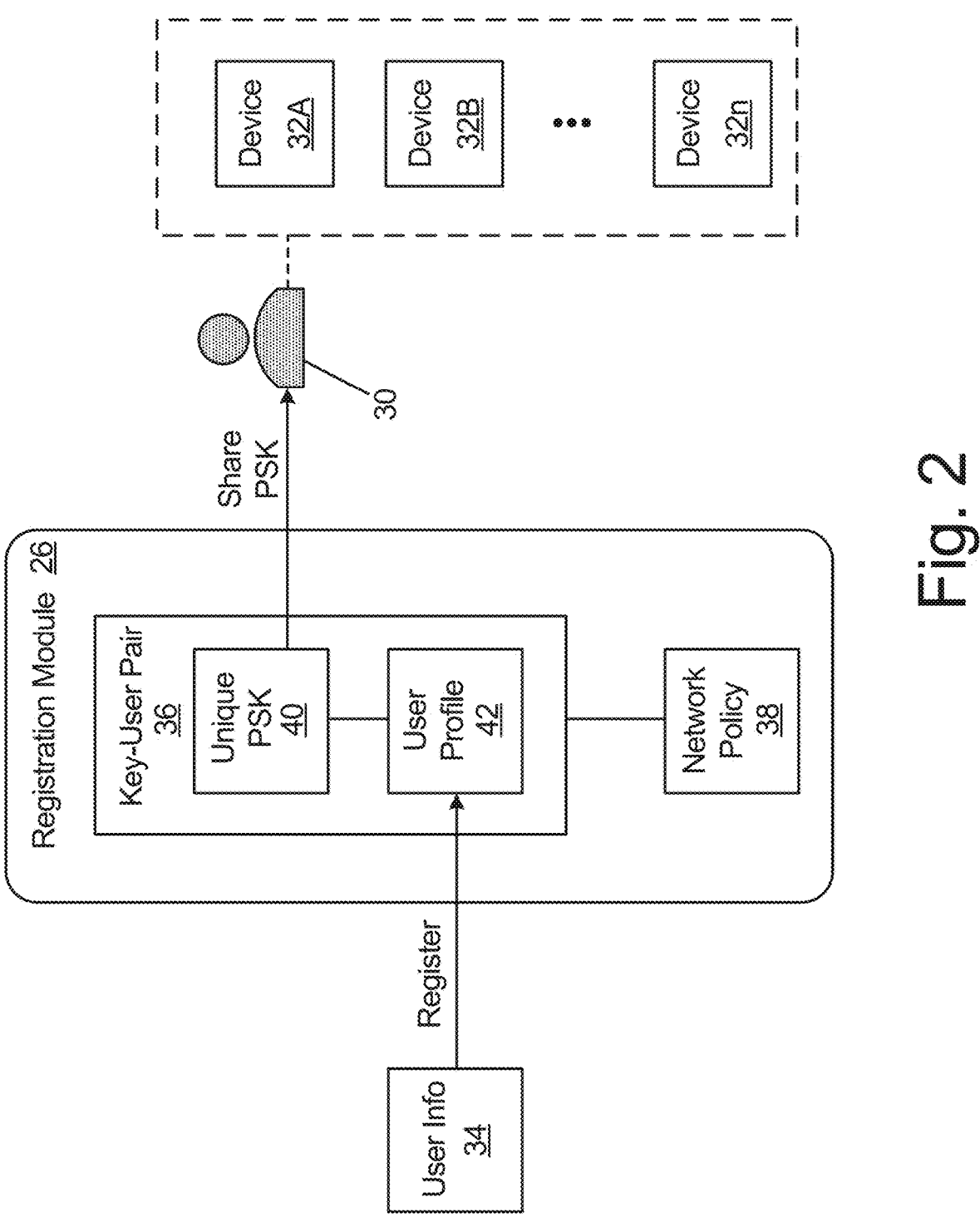
FIG. 2 is a schematic block diagram illustrating identity registration in the network system.

FIG. 2 is a schematic block diagram illustrating identity registration in network system 10. FIG. 2 shows registration module 26, user 30, devices 32A-32n, and user info 34. Registration module 26 includes key-user pair 36 and network policy 38. Key-user pair 36 includes unique pre-shared key 40 and user profile 42. It should be noted that the initialism "PSK" is used to indicate a pre-shared key in FIGS. 2-4.

Key-user pair 36 is a conceptual mapping of unique pre-shared key 40 and user profile 42 that is created by registration module 26. Key-user pair 36 represents an identity of a user entity on network system 10. Key-user pair 36 can be structured as, for example, a record of a relational database including both unique pre-shared key 40 and user profile 42. Alternatively, key-user pair 36 can comprise another data structure that maps unique pre-shared key 40 and user profile 42. That is, key-user pair 36 (and unique pre-shared key 40 and user profile 42) can be stored as any type of data structure suitable for storing information in an organized manner for later retrieval. In some examples, key-user pair 36 can be stored locally. In other examples, key-user pair 36 can be stored remotely, such as in a remote database, and accessible by registration module 26.

Key-user pair 36 includes unique pre-shared key 40. Unique pre-shared key 40 is a unique identifier for representing a user entity (e.g., user 30 associated with devices 32A-32n). For example, unique pre-shared key 40 can be a string, including a sequence of alphanumeric and/or special characters, such as in the form of a secret word, code, or phrase. For example, unique pre-shared key 40 can be human-readable. In some examples, unique pre-shared key 40 is generated by registration module 26. In other examples, unique pre-shared key 40 is received by registration module 26 via hardware or software input. Moreover, unique pre-shared key 40 can be updated by user 30 or an administrator via user interface 24 (shown in FIG. 1), such as via a web portal. Additionally, as will be described in greater detail below with reference to FIG. 4, unique pre-shared key 40 is further used to encrypt and decrypt data transmissions between wireless network 12 and devices 32A-32n that have connected to wireless network 12 using unique pre-shared key 40 (e.g., wireless connections 33A-33n, as shown in FIG. 1).

Key-user pair 36 further includes user profile 42. User profile 42 is a set of user-specific information that is registered by registration module 26 and mapped to unique pre-shared key 40. User profile 42 can include biographical or user-identifying information, such as, for example, a name, a birthdate, and contact information (a phone number, an email address, a mailing address, etc.), along with other information associated with user 30. User profile 42 can also include user-specific details that relate to wireless network 12 (shown in FIG. 1), such as a quantity or other information relating to devices 32A-32n. Any such information associated with a user is represented in FIG. 2 as user info 34. In some examples, user info 34 may be registered to user profile 42 via hardware or software input, such as via user interface 24 (shown in FIG. 1). This registration can be carried out by user 30 or an administrator. Alternatively, user profile 42 may not include user-identifying information beyond an indication of the existence of a user to whom unique pre-shared key 40 is assigned. In that case, additional user info 34 may not be input to registration module 26.

Registration module 26 further includes network policy 38. Network policy 38 controls the access and permissions of devices 32A-32n that connect to wireless network 12 using unique pre-shared key 40. Accordingly, network policy 38 is associated with key-user pair 36. For example, an association between network policy 38 and key-user pair 36 may comprise a conceptual relationship in a relational database (e.g., a record of the relational databased including both network policy 38 and key-user pair 36, unique pre-shared key 40, or user profile 42) or another suitable association or data structure that maps network policy 38 and key-user pair 36, unique pre-shared key 40, or user profile 42. That is, network policy 38 and key-user pair 36, unique pre-shared key 40, or user profile 42 can be stored as any type of data structure suitable for storing information in an organized manner for later retrieval. Examples of associating network policy 38 with key-user pair 36 will be described in greater detail below with reference to FIG. 3.

Network policy 38 includes one or more individual policies relating to access and permissions of devices 32A-32n that connect to wireless network 12. That is, network policy 38 can be a bundle or group of policies to be applied on wireless network 12 for connected devices 32A-32n. At the most basic, network policy 38 can include a policy permitting access to wireless network 12 (or some other network) in response to a connection attempt using unique pre-shared key 40. In some examples, network policy 38 can include one or more policies relating to accessibility of network resources on wireless network 12, such as a policy permitting internet or intranet access (in further examples, permitting only internet access), a policy restricting internet or intranet access, a policy permitting access to specific network resources of wireless network 12 (e.g., a community smart device, a particular server, etc.), and a policy restricting access to specific network resources of wireless network 12, among other options. In some examples, network policy 38 can include one or more policies relating to connecting to wireless network 12, such as a policy limiting a bandwidth rate of devices 32A-32n on wireless network 12, among other options. For example, the policy limiting the bandwidth rate of devices 32A-32n could set a maximum bandwidth rate, which could be constant, or which could vary depending on time of day, location, duration of connection, etc. In some examples, network policy 38 can include one or more policies relating to devices 32A-32n, such as a policy permitting ones of devices 32A-32n to connect to other ones of devices 32A-32n on wireless network 12 that are also connected using unique pre-shared key 40 or a policy limiting a number of devices 32A-32n that can be connected using unique pre-shared key 40, such as setting a maximum number of permissible concurrent connections using unique pre-shared key 40, among other options. In one non-limiting example, network policy 38 can limit user 30 to a maximum of ten device connections to wireless network 12 using unique pre-shared key 40. Generally, any number or combination of individual policies could be grouped into network policy 38, except to the extent that any policies are incompatible.

In operation, registration using registration module 26 can be initiated (e.g., by user 30 or an administrator via a web portal or application) with a request to register a new user profile. When user profile 42 is registered, or created, user profile 42 can be populated with user info 34. In some examples, user info 34 can comprise a pre-existing identity, such as from a Google account, a Facebook account, an Active Directory object, etc. In some such examples, registration can occur through a single sign-on (SSO) process tied to the pre-existing identity. In this way, the user does not need to create an entirely new user profile for use with network system 10.

Figure 3:
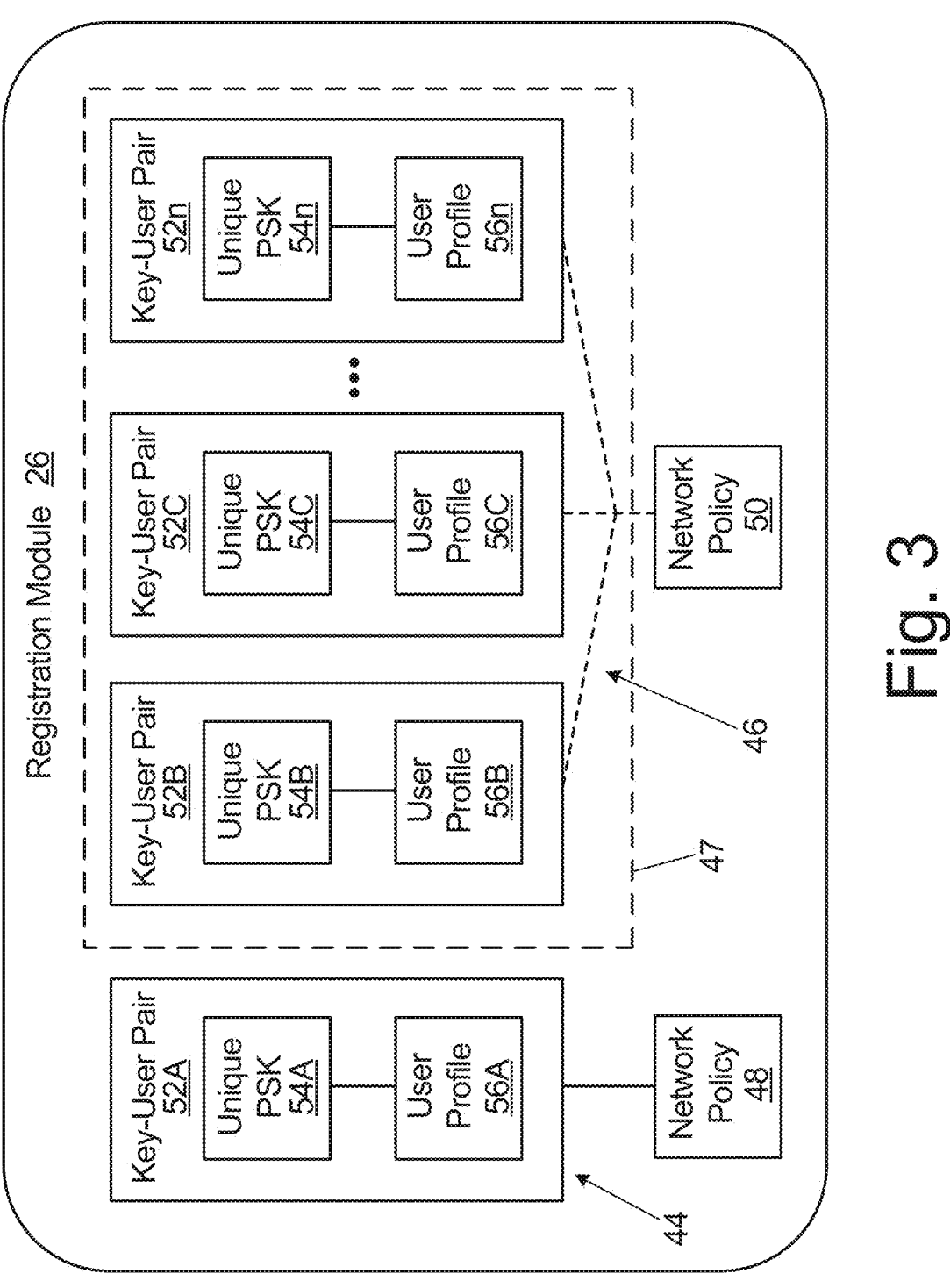
FIG. 3 is a schematic block diagram illustrating a mapped key-user pair and a mapped key-user pair group of a registration module of the network system.
Figure 4:
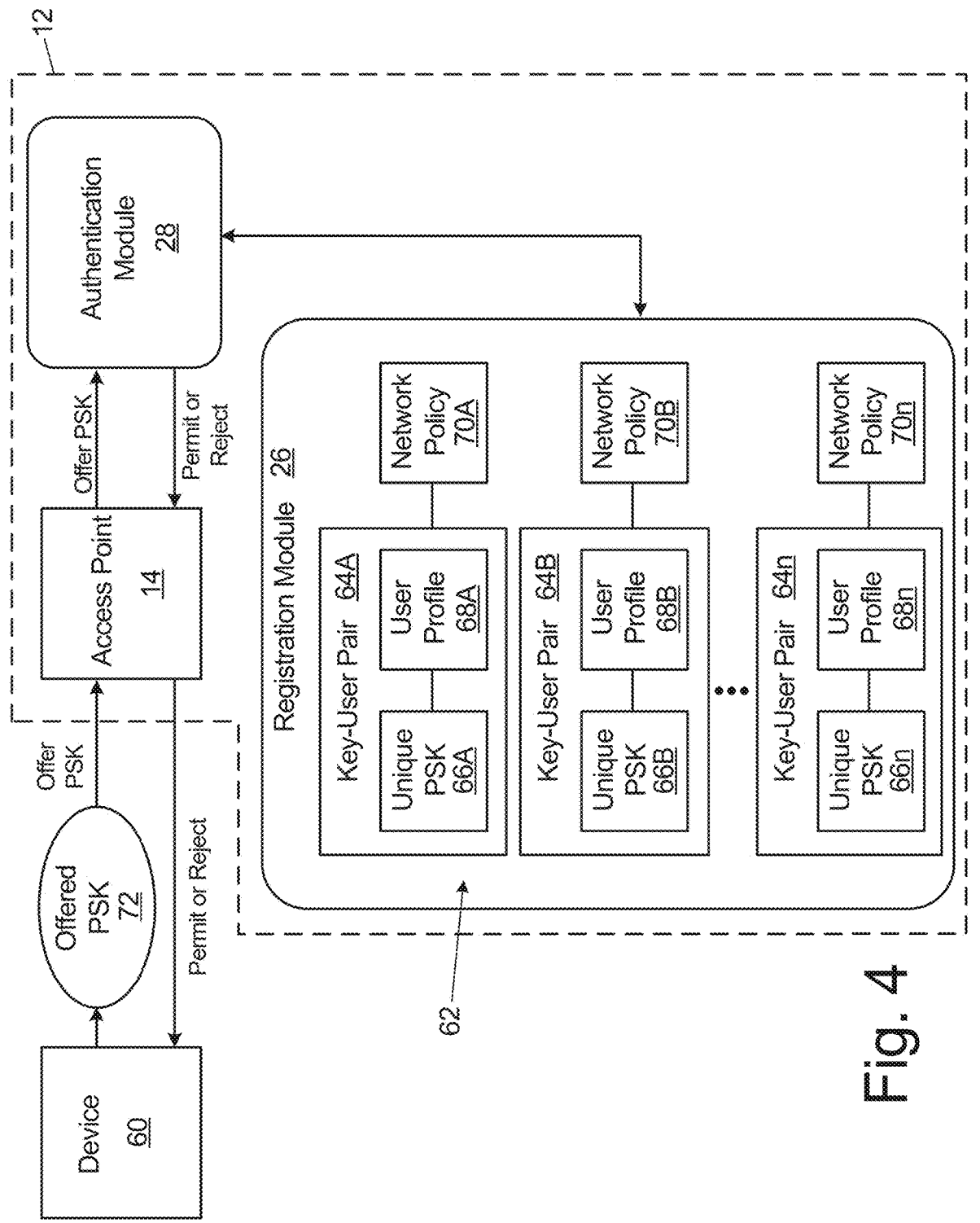
FIG. 4 is a schematic block diagram illustrating authentication for connecting a device in the network system.

Unique pre-shared key 40 is either generated or received by registration module 26 (i.e., unique pre-shared key 40 is registered in registration module 26) and mapped to user profile 42 to create key-user pair 36, which may be stored locally or remotely. In the example shown in FIG. 2, a single key-user pair 36 is created. However, as shown in FIGS. 3-4, any number of key-user pairs can be created by registration module 26, each having different unique pre-shared keys and corresponding user profiles. Network policy 38 is also registered, or created, in registration module 26, such as by an administrator for network system 10 who manages the overall network configuration. Key-user pair 36 is mapped to network policy 38, as will be described in greater detail below with reference to FIG. 3.

Unique pre-shared key 40 is shared with user 30 for the purpose of connecting any one or more of devices 32A-32n to wireless network 12. In some examples, unique pre-shared key 40 can be shared with user 30 during an onboarding process, e.g., for a new resident in a residence hall. In some examples, unique pre-shared key 40 can be shared with user 30 via a web or mobile application. In other examples, unique pre-shared key 40 (or other communications, such as updates) can be shared with user 30 via an email, text message, or app notification. For examples, an email or phone number to receive communications can be included as contact information in user profile 42.

Once unique pre-shared key 40 is shared with user 30, user 30 can input unique pre-shared key 40 into a device interface of one or more of devices 32A-32n. In a mobile application example, ones of devices 32A-32n could automatically attempt a connection to wireless network 12 based on receipt of unique pre-shared key 40 by a mobile application for the device (e.g., in a case where the device is a headless device). For example, unique pre-shared key 40 could be shared to the mobile application for the device by a different mobile application associated with network system 10. This contrasts username and password or portal registration setups typically required by conventional guest networks, which cannot be shared from one device to another.

Unique pre-shared key 40 identifies user 30 and associated devices 32A-32n on wireless network 12, rather than device-identifying or device-specific information, such as a MAC address or another type of device ID. This allows user 30 to connect any number of devices 32A-32n without needing to register each device individually or provide device-identifying information. Thus, network system 10 including registration module 26 facilitates a more user-friendly experience for connecting devices, especially for nontechnical users.

FIG. 3 is a schematic block diagram illustrating mapped key-user pair 44 and mapped key-user pair group 46 of registration module 26 of network system 10. As shown in FIG. 3, registration module 26 includes mapped key-user pair 44, mapped key-user pair group 46 (including key-user pair group 47), individually mapped network policy 48 (also referred to as "network policy 48"), and group-mapped network policy 50 (also referred to as "network policy 50"). As shown in FIG. 3, mapped key-user pair 44 and mapped key-user pair group 46 together include key-user pairs 52A-52*n*, including unique pre-shared keys 54A-54*n* and user profiles 56A-56*n*. Specifically, key-user pair 52A includes unique pre-shared key 54A and user profile 56A, key-user pair 52B includes unique pre-shared key 54B and user profile 56B, key-user pair 52C includes unique pre-shared key 54C and user profile 56C, and key-user pair 52*n* includes unique pre-shared key 54*n* and user profile 56*n*.

Key-user pairs 52A-52*n* are examples of key-user pair 36, as shown in FIG. 2. Accordingly, unique pre-shared keys 54A-54*n* and user profiles 56A-56*n* are examples of unique pre-shared key 40 and user profile 42, respectively, as shown in FIG. 2. Likewise, individually mapped network policy 48 and group-mapped network policy 50 are examples of network policy 38, as shown in FIG. 2. As such, some details of the key-user pairs and the network policies will not be repeated in this section.

Registration module 26 can include associations between key-user pairs and network policies that are one-to-one or grouped. In the example shown in FIG. 3, registration module 26 includes mapped key-user pair 44 and mapped key-user pair group 46. Mapped key-user pair 44 includes key-user pair 52A mapped to network policy 48. Mapped key-user pair 44 is an example of a one-to-one association between a key-user pair and a network policy. That is, key-user pair 52A is individually mapped to network policy 48 to form mapped key-user pair 44. In the example shown in FIG. 3, key-user pair 52A is the only key-user pair that is individually mapped; however, other examples can include more than one key-user pair that is individually mapped. In yet other examples, registration module 26 may not include any individually mapped key-user pairs, such as in an example where there are only grouped associations between key-user pairs and network policies, as will be described in greater detail below. Generally, registration module 26 can include any number of one-to-one mappings between key-user pairs and network policies.

Mapped key-user pair group 46 includes key-user pair group 47 mapped to network policy 50. Mapped key-user pair group 46 is an example of a grouped association between key-user pairs and a network policy. As shown in FIG. 3, key-user pair group 47 includes key-user pairs 52B-52*n*; however, other examples can include any number of key-user pairs in key-user pair group 47, such as more or fewer than three key-user pairs. Key-user pair group 47 can include key-user pairs that share some commonality, such as based on a common characteristic in the corresponding user profiles 56B-56*n*. In some examples, this could include permissions based on other domain memberships (e.g., from an SSO registration) as indicated in corresponding user profiles 56B-56*n*. Key-user pair group 47 could also be formed based on a decision by an administrator to include a respective key-user pair in key-user pair group 47. For example, each key-user pair 52B-52*n* included in key-user pair group 47 could represent a user who is a student (a different key-user pair group could then include key-user pairs that represent users who are building IT staff, etc.). Moreover, additional key-user pairs could be added into key-user pair group 47 at some later point in time, e.g., by an administrator of network system 10 (shown in FIG. 1). For example, network policy 50 could be a generic policy that will be applied for all users of a certain type who connect to wireless network 12 (shown in FIG. 1), and the number of users of that type might change over time, such as in a residence hall setting. Any of key-user pairs 52B-52*n* could also be individually re-mapped to a different network policy such that the re-mapped key-user pair is no longer part of key-user pair group 47.

Key-user pair group 47 (including key-user pairs 52B-52*n*) is mapped to group-mapped network policy 50 to form mapped key-user pair group 46. That is, key-user pairs 52B-52*n* have a grouped association with network policy 50 through key-user pair group 47, such that network policy 50 applies to each of key-user pairs 52B-52*n*. For example, depending on the data structure, each of key-user pairs 52B-52*n* can be linked individually to group-mapped network policy 50 or can be linked to key-user pair group 47 that is linked to group-mapped network policy 50. In the example shown in FIG. 3, mapped key-user pair group 46 is the only grouped association between key-user pairs and a network policy; however, other examples can include more than one key-user pair group. In yet other examples, registration module 26 may not include any key-user pair groups, such as in an example where there are only individually mapped key-user pairs (e.g., mapped key-user pair 44 described above). Generally, registration module 26 can include any number of grouped mappings between key-user pairs and network policies.

In operation, network policy 48 or network policy 50 will be applied to network connections (e.g., to wireless network 12, as shown in FIG. 1) depending on the pre-shared key that is used to establish the connection. Network policy 48 will be applied when a network connection is established using unique pre-shared key 54A. Network policy 50 will be applied when a network connection is established using any of unique pre-shared keys 54B-54*n*.

The variations possible with individually mapped network policy 48 and group-mapped network policy 50 allow for greater flexibility for managing network connections based on identities in network system 10. In some scenarios, it may be more efficient to apply network policies in a grouped manner (e.g., mapped key-user pair group 46), but network system 10 also retains the option for tailoring network policies to individual identities (e.g., mapped key-user pair 44).

FIG. 4 is a schematic block diagram illustrating authentication for connecting device 60 in network system 10. FIG. 4 shows device 60 and wireless network 12, including access point 14, registration module 26, and authentication module 28. Registration module 26 includes mapped key-user pairs 62. Mapped key-user pairs 62 includes key-user pairs 64A-64*n* (including unique pre-shared keys 66A-66*n* and user profiles 68A-68*n*) associated with network policies 70A-70*n*. Specifically, key-user pair 64A includes unique pre-shared key 66A and user profile 68A and is associated with network policy 70A, key-user pair 64B includes unique pre-shared key 66B and user profile 68B and is associated with network policy 70B, and key-user pair 64*n* includes unique pre-shared key 66*n* and user profile 68*n* and is associated with network policy 70*n*. FIG. 4 also shows offered pre-shared key 72.

Key-user pairs 64A-64*n* are examples of key-user pair 36, as shown in FIG. 2, or any of key-user pairs 52A-52*n*, as shown in FIG. 3. Accordingly, unique pre-shared keys 66A-66*n* are examples of unique pre-shared key 40 (as shown in FIG. 2) or any of unique pre-shared keys 54A-54*n* (as shown in FIG. 3), and user profiles 68A-68*n* are examples of user profile 42 (as shown in FIG. 2) or any of user profiles 56A-56*n* (as shown in FIG. 3). Likewise, network policies 70A-70*n* are examples of any of network policy 38 (as shown in FIG. 2), individually mapped network policy 48 (as shown in FIG. 3), or group-mapped network policy 50 (as shown in FIG. 3). As such, some details of the key-user pairs and the network policies will not be repeated in this section.

Device 60 is an electronic device with networking capability such that device 60 can connect wirelessly to wireless network 12. A user (e.g., user 30, as shown in FIGS. 1-2) can initiate a connection attempt to access point 14 of wireless network 12 by inputting offered pre-shared key 72 to device 60. Device 60 submits offered pre-shared key 72 to wireless network 12 through access point 14, which communicates offered pre-shared key 72 to access server 16 (shown in FIG. 1) where it is received by authentication module 28. Access server 16 can be configured to read offered pre-shared key 72. Before authentication occurs, device 60 can connect to access point 14 but is not permitted to use wireless network 12.

Authentication module 28 receives offered pre-shared key 72 and accesses mapped key-user pairs 62 from registration module 26. Registration module 26 can retrieve stored mapped key-user pairs 62 from either local or remote data storage. Although illustrated in FIG. 4 as three key-user pairs 64A-64n, mapped key-user pairs 62 can include any number of key-user pairs 64A-64n. Authentication module 28 attempts to authenticate the user who initiated the connection attempt for device 60 (and, in effect, the connection from device 60) by comparing offered pre-shared key 72 to unique pre-shared keys 66A-66n of mapped key-user pairs 62. More specifically, authentication module 28 determines whether offered pre-shared key 72 corresponds to any one of unique pre-shared keys 66A-66n of mapped key-user pairs 62. In some examples, authentication module 28 determines whether offered pre-shared key 72 and one of unique pre-shared keys 66A-66n are identical.

Authentication module 28 can permit the connection of device 60 to wireless network 12 upon determining that offered pre-shared key 72 corresponds to one of unique pre-shared keys 66A-66n. That is, authentication module 28 permits the connection of device 60 to wireless network 12 when authentication is successful. When authentication module 28 determines that offered pre-shared key 72 corresponds to one of unique pre-shared keys 66A-66n, authentication module 28 will communicate back to access point 14 or other network infrastructure and device 60 to permit device 60 to connect to wireless network 12. More specifically, authentication module 28 permits device 60 to connect to wireless network 12 according to the one of network policies 70A-70n that is associated with the corresponding one of unique pre-shared keys 66A-66n in mapped key-user pairs 62. Accordingly, device 60 is provisioned on wireless network 12 with the identity associated with the corresponding one of unique pre-shared keys 66A-66n.

In some examples, authentication module 28 rejects the network connection between device 60 and wireless network 12 when offered pre-shared key 72 does not correspond to any one of unique pre-shared keys 66A-66n (i.e., when authentication is unsuccessful). In some examples, authentication module 28 may communicate to device 60 an indication that offered pre-shared key 72 does not correspond to one of unique pre-shared keys 66A-66n. In other examples, authentication module 28 may communicate to device 60 an indication of an alternative option to connect to wireless network 12 when offered pre-shared key 72 does not correspond to one of unique pre-shared keys 66A-66n.

Once the network connection has been permitted, data transmitted between device 60 and wireless network 12 is encrypted and decrypted using the corresponding one of unique pre-shared keys 66A-66n. That is, the individual connection to wireless network 12 from device 60 is built with the corresponding one of unique pre-shared keys 66A-66n. Existing network infrastructure can be leveraged to isolate devices that connect with the same unique pre-shared key into their own network segment or slice that shares the same overall infrastructure for wireless network 12. Others who connect to wireless network 12 using a different key (different from the corresponding one of unique pre-shared keys 66A-66n) will be unable to see data transmitted between device 60 and wireless network 12.

As illustrated in FIG. 4, user interaction with network system 10 is minimized, which is beneficial for nontechnical users or for situations where many devices need to be onboarded to wireless network 12. A user only needs to input one of unique pre-shared keys 66A-66n (as offered pre-shared key 72) to connect device 60 to wireless network 12. More specifically, establishing a connection to wireless network 12 does not require network system 10 to capture a MAC address or other device-identifying information for device 60, so the user does not need to know what a MAC address is or where to find it. Additionally, network system 10 does not require access via a web portal for connecting to wireless network 12, which is a step many conventional guest networks require that complicates the process of connecting to the network.

Existing pre-shared key techniques do not allow for identifying a user based on the pre-shared key itself because the pre-shared key is not typically known on the system back end and there would be no way to make decisions based on the pre-shared key alone. In such cases, either all users have the same key, or, if the key is for an individual user, then it is tied to a MAC address or other device-identifying information so that it can be looked up. In contrast, authentication module 28 can access mapped key-user pairs 62 from registration module 26 to authenticate based on a comparison between offered pre-shared key 72 and stored unique pre-shared keys 66A-66n, which are associated with corresponding user profiles 68A-68n and network policies 70A-70n. Thus, an identity can be associated with device 60 on wireless network 12 based on the one of unique pre-shared keys 66A-66n that corresponds to offered pre-shared key 72.

Additionally, the corresponding one of unique pre-shared keys 66A-66n has dual utility as an identifier and also for building the individual encrypted communication between device 60 and wireless network 12. The encryption aspect of unique pre-shared keys 66A-66n is beneficial compared to conventional open guest networks where network traffic and data is visible to others on the network. In other words, the use of unique pre-shared keys 66A-66n adds another layer of security for connections to wireless network 12.

Figure 5:
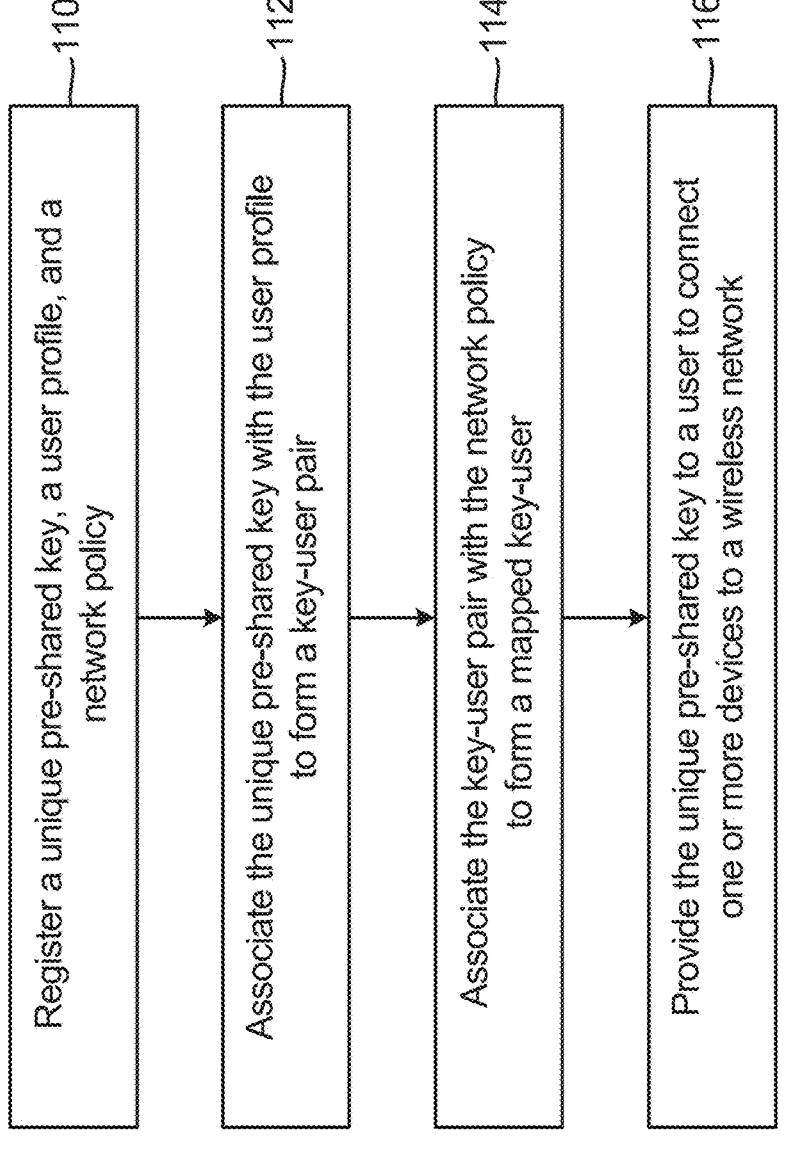
FIG. 5 is a process flowchart showing steps of a process for registering an identity and sharing a pre-shared key.

Processes associated with network system 10 are shown in FIGS. 5-6. Accordingly, the processes illustrated in FIGS. 5-6 will be described with reference to components of network system 10 described above (FIGS. 1-4).

FIG. 5 is a process flowchart showing steps 110-116 of process 100 for registering an identity and sharing a pre-shared key. As illustrated in FIG. 5, a first step of process 100 is registering a unique pre-shared key, a user profile, and a network policy in registration module 26 of network system 10 (step 110). In some examples, registration module 26 generates the unique pre-shared key. In some examples, the unique pre-shared key is a sequence of alphanumeric and/or special characters. In some examples, the unique pre-shared key is human-readable. In some examples, registration module 26 receives user-identifying information and generates the user profile based on the user-identifying information. In further examples, registration module 26 generates the user profile from a pre-existing user account via a single sign-on (SSO) process.

At step 112, registration module 26 associates the unique pre-shared key with the user profile to form a key-user pair, and, at step 114, registration module 26 associates the key-user pair with the network policy to form a mapped key-user pair. In some examples, the mapped key-user pair represents an individual association between a network policy, the unique pre-shared key, and the user profile. In other examples, the mapped key-user pair is included in a mapped key-user pair group that represents a grouped association between the network policy and multiple key-user pairs of the mapped key-user pair group. In some examples, the mapped key-user pair is stored in a remote database. In some examples, the network policy includes at least one of a policy for limiting a bandwidth rate of the wireless device over wireless network 12, a policy for permitting the wireless device to connect to a plurality of wireless devices on wireless network 12 that are connected using a same unique pre-shared key, and a policy for limiting a number of devices that can connect to wireless network 12 using the same unique pre-shared key. In some examples, the network policy includes at least one of a policy for permitting only internet access, a policy for permitting access to specific network resources, and a policy for restricting access to specific network resources.

At step 116, network system 10 provides the unique pre-shared key to a user (e.g., via user interface 24) to connect one or more devices to wireless network 12. The unique pre-shared key is used to encrypt and decrypt data transmitted between a connected wireless device and wireless network 12.

Step 116 can be a final step of process 100. Although illustrated as single steps, it should be understood that each of steps 110-116 can, in other examples, be repeated any number of times in process 100.

FIG. 6 is a process flowchart showing steps 210-218 of process 200 for authentication with a pre-shared key. As illustrated in FIG. 6, a first step of process 200 is receiving an offered pre-shared key from a wireless device via wireless network 12 at authentication module 28 of network system 10 (step 210).

At step 212, authentication module 28 accesses a mapped key-user pair (e.g., from registration module 26), the mapped key-user pair comprising a unique pre-shared key and a user profile. In some examples, the unique pre-shared key is a sequence of alphanumeric and/or special characters. In some examples, the unique pre-shared key is human-readable. In some examples, the mapped key-user pair represents an individual association between a network policy, the unique pre-shared key, and the user profile. In other examples, the mapped key-user pair is included in a mapped key-user pair group that represents a grouped association between the network policy and multiple key-user pairs of the mapped key-user pair group. In some examples, the mapped key-user pair is stored in a remote database.

At decision 214, authentication module 28 determines whether the offered pre-shared key corresponds to the unique pre-shared key of the mapped key-user pair. In some examples, authentication module 28 further determines whether the offered pre-shared key and the unique pre-shared key are identical.

In response to determining that the offered pre-shared key corresponds to the unique pre-shared key (e.g., that is accessible by registration module 26) ("Yes" in FIG. 6), authentication module 28 permits the wireless device to connect to wireless network 12 according to the network policy associated with the mapped key-user pair (step 216). The unique pre-shared key is used to encrypt and decrypt data transmitted between the wireless device and wireless network 12. In some examples, the network policy includes at least one of a policy for limiting a bandwidth rate of the wireless device over wireless network 12, a policy for permitting the wireless device to connect to a plurality of wireless devices on wireless network 12 that are connected using a same unique pre-shared key, and a policy for limiting a number of devices that can connect to wireless network 12 using the same unique pre-shared key. In some examples, the network policy includes at least one of a policy for permitting only internet access, a policy for permitting access to specific network resources, and a policy for restricting access to specific network resources.

In response to determining that the offered pre-shared key does not correspond to a unique pre-shared key ("No" in FIG. 6), authentication module 28 rejects a network connection between the wireless device and wireless network 12 (step 218). In some examples, network system 10 further communicates an indication to the wireless device in response to determining that the offered pre-shared key does not correspond to the unique pre-shared key of the key-user pair.

Either step 216 or step 218 can be a final step of process 200. Although illustrated as single steps, it should be understood that each of steps 210-218 can, in other examples, be repeated any number of times in process 200.

Referring to FIGS. 5-6 together, process 100 and process 200 allow for users to connect their devices to a managed wireless network without needing to register each device individually or provide any device-identifying information. Further, all devices connected using the same PSK benefit from the same network policy configuration upon initial connection to the managed wireless network.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A network system comprising:

a processor; and computer-readable memory encoded with instructions that, when executed by the processor, cause the network system to:

register a unique pre-shared key, a user profile, and a network policy;

associate the unique pre-shared key with the user profile to form a key-user pair;

associate the key-user pair with the network policy to form a mapped key-user pair; and provide the unique pre-shared key to a user to connect one or more devices to a wireless network;

wherein the unique pre-shared key is used to encrypt and decrypt data transmitted between a connected wireless device and the wireless network, and wherein the network policy includes at least one of:

a policy for limiting a bandwidth rate of the wireless device over the wireless network;

a policy permitting the wireless device to connect to a plurality of wireless devices on the wireless network that are connected using a same unique pre-shared key;

a policy for limiting a number of devices that can connect to the wireless network using the same unique pre-shared key;

a policy for permitting only internet access;

a policy for permitting access to specific network resources; and a policy for restricting access to specific network resources.

2. The network system of claim 1, wherein the instructions that cause the network system to register the unique pre-shared key further cause the network system to generate the unique pre-shared key.

3. The network system of claim 1, wherein the unique pre-shared key is a sequence of at least one of alphanumeric characters and special characters.

4. The network system of claim 3, wherein the unique pre-shared key is human-readable.

5. The network system of claim 1, wherein the instructions that cause the network system to register the user profile further cause the network system to:

receive user-identifying information; and generate the user profile based on the user-identifying information.

6. The network system of claim 5, wherein the network system is further configured to generate the user profile from a pre-existing user account via a single sign-on (SSO) process.

7. The network system of claim 1, wherein the mapped key-user pair represents an individual association between the network policy, the unique pre-shared key, and the user profile.

8. The network system of claim 1, wherein the mapped key-user pair is included in a mapped key-user pair group that represents a grouped association between the network policy and multiple key-user pairs of the mapped key-user pair group.

9. A method of identity registration for a managed wireless network comprising:

registering a unique pre-shared key, a user profile, and a network policy;

associating the unique pre-shared key with the user profile to form a key-user pair;

associating the key-user pair with the network policy to form a mapped key-user pair;

providing the unique pre-shared key to a user to connect one or more devices to a wireless network; and encrypting and decrypting data transmitted between a connected wireless device and the wireless network using the unique pre-shared key, wherein the network policy includes at least one of:

a policy for limiting a bandwidth rate of the wireless device over the wireless network;

a policy permitting the wireless device to connect to a plurality of wireless devices on the wireless network that are connected using a same unique pre-shared key;

a policy for limiting a number of devices that can connect to the wireless network using the same unique pre-shared key;

a policy for permitting only internet access;

a policy for permitting access to specific network resources; and a policy for restricting access to specific network resources.

10. The method of claim 9, wherein registering the unique pre-shared key further comprises generating the unique pre-shared key.

11. The method of claim 9, wherein the unique pre-shared key is a sequence of at least one of alphanumeric characters and special characters.

12. The method of claim 11, wherein the unique pre-shared key is human-readable.

13. The method of claim 9, wherein registering the user profile further comprises:

receiving user-identifying information; and generating the user profile based on the user-identifying information.

14. The method of claim 13, wherein generating the user profile further comprises generating the user profile from a pre-existing user account via a single sign-on (SSO) process.

15. The method of claim 9, wherein the mapped key-user pair represents an individual association between the network policy, the unique pre-shared key, and the user profile.

16. The method of claim 9, wherein the mapped key-user pair is included in a mapped key-user pair group that represents a grouped association between the network policy and multiple key-user pairs of the mapped key-user pair group.

* * * * *